(12) United States Patent
Kobayashi (10) Patent No.: US 6,256,569 B1
(45) Date of Patent: Jul. 3, 2001

(54) ACTUATOR CONTROLLERS FOR MOTOR VEHICLES

(75) Inventor: Hitoshi Kobayashi, Tokyo (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/172,260

(22) Filed: Oct. 14, 1998

(30) Foreign Application Priority Data

Oct. 15, 1997 (JP) .................................................. 9-282168

(51) Int. Cl.[7] .............................. G06F 13/00; G05B 9/02
(52) U.S. Cl. .............................. 701/70; 701/33; 701/57; 340/507; 340/825.16; 340/438; 307/440
(58) Field of Search .................. 701/70, 29, 33; 364/424.03; 340/507; 303/100; 477/108, 109

(56) References Cited

PUBLICATIONS

D4, Kraftfahrtechnlsches Taschenbuch, Bosch, 22nd ed., 1995, pp. 800–801.
D5, Taschenbuch der Nachrlchtenverarbeltung, 1967, pp. 818–819.
C. Beyer et al., "Electronic Braking System EBS—Status and Advanced Functions", *Society of Automotive Engineers, Inc.*, 9 pages, 1997.

J. Wrede et al., "Electronically controlled compressed–air braking system for commercial vehicles", XXIV Fisita Congress, pp. 113–121, Jun. 7–11, 1992, London.
H. Decker et al., "Brake–by–Wire, Solutions, Advantages and the Need for Standardization", Vortrag anläβlich, *Convergence, International Congress on Transportation Electronics*, Oct. 17–19, 1994, pp. 1–14, Hyatt Regency, Dearborn, Michigan/USA.
Robert Bosch GmbH, editor; "Kraftfahrtechnisches Taschenbuch", 22nd edition, Düssedorf: VDI–Verlag, 1995.
K. Steinbuch, editor; "Taschenbuch der Nachrichtenverarbeitung", 2nd edition, Springer–Verlag, Berlin, Heidelberg, New York, 1967, p. 818.

*Primary Examiner*—William A. Cuchlinski, Jr.
*Assistant Examiner*—Tuan C To
(74) *Attorney, Agent, or Firm*—Foley & Lardner (57) ABSTRACT

An actuator controller includes a control unit including a main part carrying out a preprogrammed processing of an input signal and being disposed in a first position of a motor vehicle and a drive part integrated with an actuator unit and being disposed in a second position of the motor vehicle distant from the first position for forming a drive signal in accordance with a processing result of the main part, and a communication wire connected to the main and drive parts. The main part provides the processing result as a communication signal by a serial communication, and the drive part converts the communication signal received into the drive signal.

22 Claims, 9 Drawing Sheets

CAN PROTOCOL

FIG.7

START-STOP PROTOCOL

FIG.5

| | 7BITS | 6BITS | 5BITS | 4BITS | 3BITS | 2BITS | 1BIT | 0BIT |
|---|---|---|---|---|---|---|---|---|
| 1ST BYTE | VALVE 1 | VALVE 2 | VALVE 3 | VALVE 4 | VALVE 5 | VALVE 6 | VALVE 7 | VALVE 8 |
| 2ND BYTE | VALVE 9 | VALVE 10 | VALVE 11 | VALVE 12 | 0 | RELAY 1 | RELAY 2 | RELAY 3 |
| 3RD BYTE | LAMP 1 | LAMP 2 | LAMP 3 | LAMP 4 | 0 | 0 | 0 | 0 |

FIG.6A

|  | 7BITS | 6BITS | 5BITS | 4BITS | 3BITS | 2BITS | 1BIT | 0BIT |
|---|---|---|---|---|---|---|---|---|
| 1ST BYTE | PWFR-3 | PWFR-2 | PWFR-1 | PWFR-0 | PWFL-3 | PWFL-2 | PWFL-1 | PWFL-0 |
| 2ND BYTE | PWRR-3 | PWRR-2 | PWRR-1 | PWRR-0 | PWRL-3 | PWRL-2 | PWRL-1 | PWRL-0 |
| 3RD BYTE | FR1 | FR0 | FL1 | FL0 | RR1 | RR0 | RL1 | RL0 |
| 4TH BYTE | RELAY 1 | RELAY 2 | RELAY 3 | VALVE 1 | VALVE 2 | VALVE 3 | VALVE 4 | 0BIT |
| 5TH BYTE | LAMP 1 | LAMP 2 | LAMP 3 | LAMP 4 | 0 | 0 | 0 | 0 |

FIG.6B

- PW3~PW0 : PULSE WIDTH (0~15ms)

|  | 7 | 6 | 5 | 4 | 3 | 2 | 1 | 0 |  |
|---|---|---|---|---|---|---|---|---|---|
| PW1 | 0 | 0 | 0 | 0 | 0 | 0 | 0 | 0 | 0 |
| PW2 | 0 | 0 | 0 | 1 | 1 | 1 | 0 | 0 | 3 |
| PW3 | 0 | 1 | 0 | 1 | 0 | 1 | 0 | 1 | (see note) |

| | 7 | 6 | 5 | 4 | 3 | 2 | 1 | 0 | dec |
|---|---|---|---|---|---|---|---|---|---|
| PW1 | 0 | 0 | 0 | 0 | 0 | 0 | 0 | 0 | 0 |
| PW2 | 0 | 0 | 0 | 1 | 1 | 1 | 0 | 0 | 3 |
| PW3 | 0 | 1 | 0 | 0 | 1 | 0 | 1 | 0 | — |
| PW4 | 1 | 0 | 1 | 0 | 1 | 0 | 1 | 0 | — |
| PW5 | 1 | 1 | 1 | 1 | 1 | 1 | 1 | 1 | 15 |

- FR1, FR0 : CONTROL MODE (PRESSURE INCREASE, DECREASE & PRESERVATION)
  - FR1=0, FR0=0 : PRESSURE DECREASE
  - FR1=1, FR0=0 : PRESSURE PRESERVATION
  - FR1=1, FR0=1 : PRESSURE INCREASE

FIG.10

ACTUATOR CONTROLLERS FOR MOTOR VEHICLES

BACKGROUND OF THE INVENTION

The present invention relates generally to actuator controllers for motor vehicles, and more particularly, to the actuator controllers adapted to braking controllers for carrying out ABS control for preventing wheel lock during braking operation and behavior stabilizing control for stabilizing vehicular behavior by a braking force produced regardless of driver's braking operation.

A known braking controller comprises a brake circuit for ensuring communication of a master cylinder with wheel cylinders; a fluid-pressure controlling valve arranged with the brake circuit for enabling achievement of three pressure states: an increased-pressure state that the brake circuit is in communication, a decreased-pressure state that the wheel cylinder communicates with a drain circuit, and a preserved-pressure state that the wheel cylinder is closed with respect to the brake circuit and the drain circuit; a reservoir arranged with the drain circuit for enabling accumulation of a brake-fluid pressure; a circulation circuit for ensuring communication of the drain circuit with the brake circuit in a position upstream of the fluid-pressure controlling valve; a pump arranged with the circulation circuit for returning to the brake circuit brake fluid accumulated in the reservoir; and a control unit for operating the fluid-pressure controlling valve and the pump, wherein in order to obtain ABS control for preventing wheel lock during braking operation, the control unit actuates the fluid-pressure controlling valve in accordance with information input from sensors to at least decrease and preserve a wheel-cylinder pressure, and operates the pump to circulate to the brake circuit brake fluid within the reservoir.

With such known device, the control unit includes a control part arranged in a cabin and including a CPU, and a drive part connected thereto and arranged, e.g. in an engine room for forming a signal for driving actuators. With this structure, wires at least as many as the actuators are needed between the control part and the drive part. When taking account of wiring for a feedback signal and fail-safe signal, the number of wires and connectors needed is substantially twice as many as that of actuators. Moreover, it is necessary to prepare wires and connectors for connecting the sensors and the control part. Due to increased number of wires and connectors, wiring and connecting work is time-consuming, resulting in bad assembling efficiency. Moreover, for wiring between the inside of the cabin and the outside thereof, a hole should be formed through a vehicle body, which needs an expensive sealing. Moreover, since this hole constitutes a noise entrance passage, the measures should be taken for prevention of noise entrance, increasing manufacturing cost.

JP-A 8-11692 proposes an art for solving such inconvenience. This reference shows a braking controller for carrying out ABS control for preventing wheel lock during braking operation, which comprises an actuator unit including a valve for decreasing, preserving and increasing a fluid pressure within a wheel cylinder, a reservoir for accumulating brake fluid drained from the wheel cylinder, a pump for circulating to a brake circuit brake fluid within the reservoir and a motor for driving the pump, and a control unit integrated with one side of the actuator unit and including a control part for carrying out a preprogrammed processing of signals input from sensors and a drive part for forming a drive signal for driving the valve and the motor in accordance with the results of processing of the control part.

With the braking controller as disclosed in JP-A 8-11692, the control unit and the actuator unit are previously internally connected to each other, so that apparatus to be externally connected to the control unit are sensors and a power supply only, resulting in largely reduced number of wires and connectors arranged outside the control unit.

Recently, a braking controller is proposed which carries out behavior stabilizing control for stabilizing vehicular behavior, when falling in a unstable state, e.g. oversteer and understeer, by a predetermined braking force produced in a predetermined wheel in accordance therewith. This device has a larger number of selector valves than the device for carrying out ABS control, and includes a pump with large capacity or pumps arranged in series to obtain sufficient and highly responsive brake-fluid pressure. That is, not only the number of actuators is increased, but the capacity of the motor is increased.

When applying the art proposed in JP-A 8-11692 to the braking controller for carrying out behavior stabilizing control, the sizes of the actuator unit and the control unit are both enlarged, i.e. the overall size of the device is enlarged, lowering the degree of freedom of mounting with respect to the vehicle. Moreover, an increase in number of actuators and capacity of the motor causes an increase in heat produced in both the actuator unit and drive part for driving the actuators, resulting in difficult achievement of protection of electric apparatus such as CPU which constitute the control part from heat. Moreover, when constructing the control part and the drive part in one unit, the overall structure of the device should be reduced to mount the control unit to one side of the actuator unit, resulting in difficult assembling work and lowered degree of freedom of the design due to increased design restriction.

Further, in order to carry out behavior stabilizing control, it is necessary to arrange a yaw-rate sensor for sensing a yaw rate of a vehicle and an acceleration sensor for sensing an acceleration of the vehicle. Such sensors are preferably integrated with an electronic control unit in view of assembling work with respect to the vehicle. In the device of JP-A 8-11692, the control unit and the actuator unit are disposed in an engine room which is undesirable in view of not only heat environment, but sensing of a yaw rate due to a distance from the center of the vehicle. Furthermore, the control unit undergoes vibrations of the motor, which forms undesirable environment in view of sensing of an acceleration of the vehicle. Thus, the yaw-rate sensor and the acceleration sensor should be arranged separately from the control unit, forming a disadvantage in view of assembling work.

Still further, the number of valves or actuators in the braking controller varies in accordance with the difference in the specifications of a vehicle, e.g. control method such as three-channel or four-channel control. This requires a change of a structure of the drive part of the actuator unit in accordance with the specifications of a vehicle. As a consequence, with the art proposed in JP-A 8-11692 wherein the control part and the drive part are integrated with the electronic control unit, the device should be manufactured in changing its structure in accordance with the specifications of a vehicle, having lowered adaptability.

It is, therefore, an object of the present invention to provide actuator controllers for motor vehicles which allow a reduction in parts, achievement of a thermally protected structure, and improvement in adaptability, mountability and assembling efficiency with reduced manufacturing cost. Another object of the present invention is to provide the actuator controllers which allow improvement in information transmittablity, reliability, anti-noise performance and sensing performance.

SUMMARY OF THE INVENTION

An aspect of the present invention lies in providing a system for a motor vehicle, comprising:

an actuator unit;

a first control unit, said first control unit carrying out a preprogrammed processing of an input signal, said first control unit being disposed in a first position of the motor vehicle;

a second control unit connected to and integrated with said actuator unit, said second control unit being disposed in a second position of the motor vehicle distant from said first position, said second control unit forming a drive signal in accordance with a processing result of said first control unit; and a first communication wire connected to said first and second control units, said first control unit providing said processing result as a communication signal by a serial communication, said second control unit converting said communication signal received into said drive signal.

DETAILED DESCRIPTION OF THE INVENTION

Referring to the drawings, a description will be made with regard to an actuator controller for motor vehicles embodying the present invention.

Figure 1:
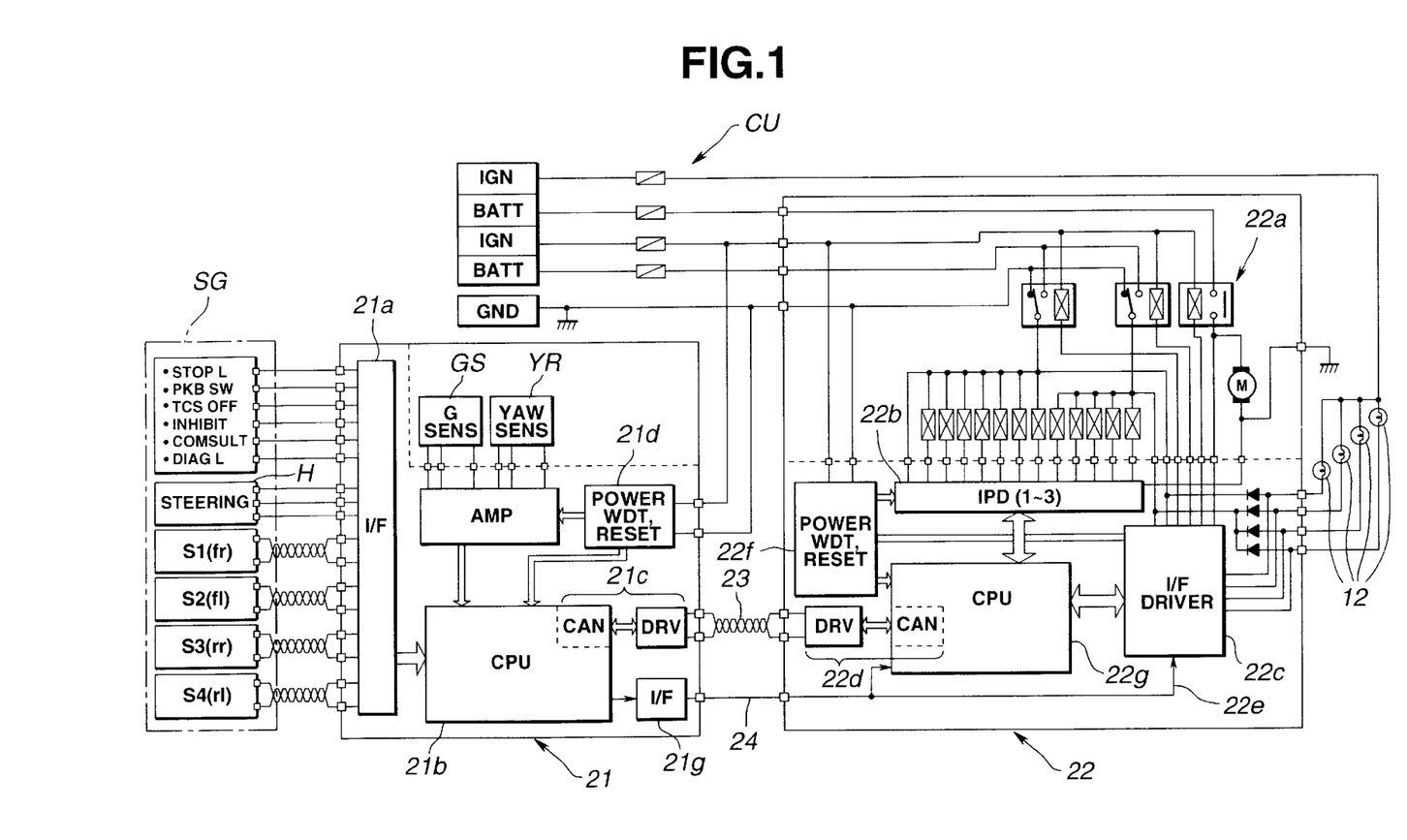
FIG. 1 is a circuit diagram showing an actuator controller for motor vehicles embodying the present invention.
Figure 2:
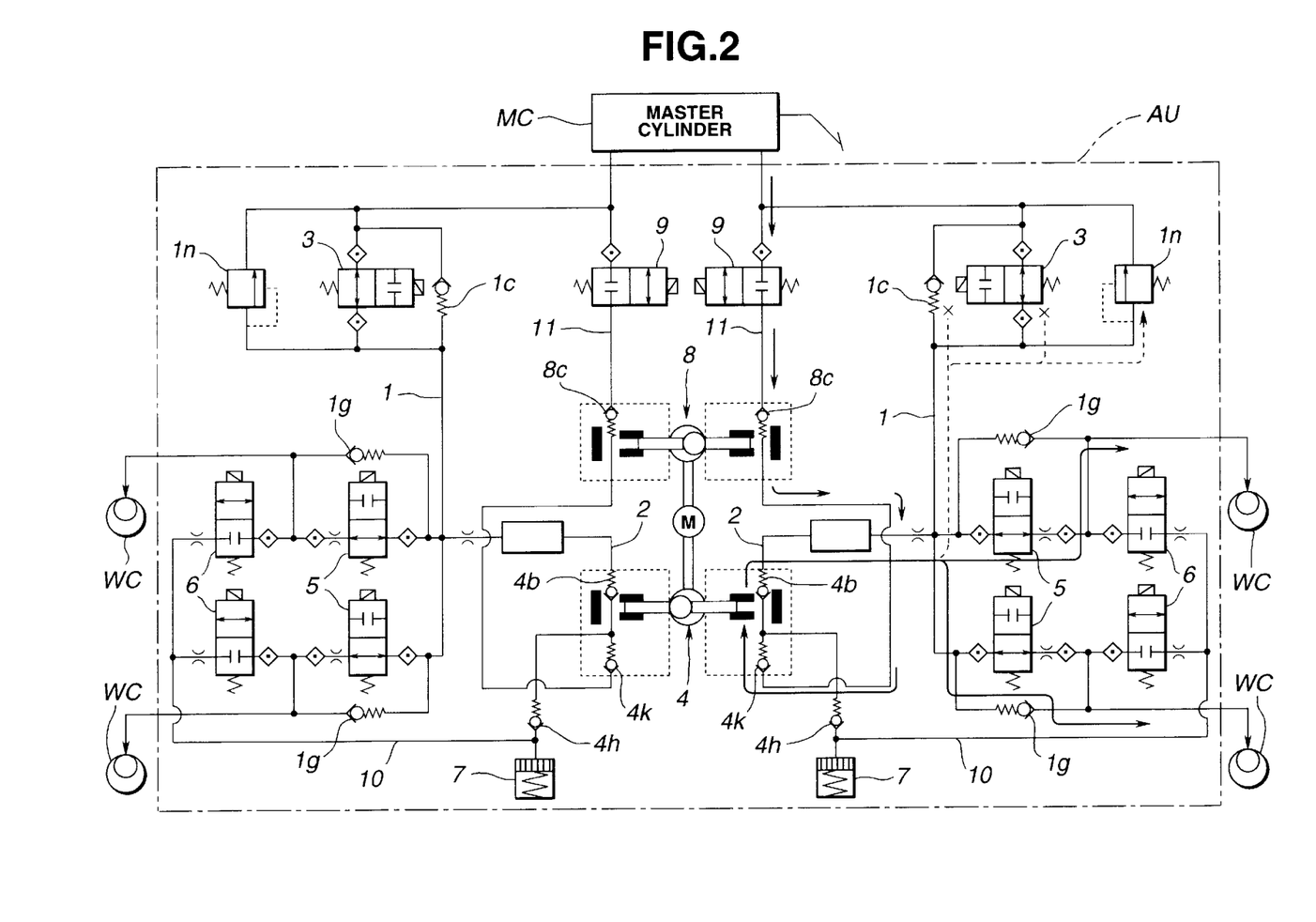
FIG. 2 is a hydraulic circuit showing a braking controller.

FIGS. 1–6 show a first embodiment of the present invention. Referring to FIG. 2, an actuator unit AU, which is generally used in a braking controller for carrying out behavior stabilizing control, is arranged between brake circuits 1, each connecting a master cylinder MC and wheel cylinders WC. Note that the brake circuits 1 are two in number, each connecting two wheel cylinders WC as shown in FIG. 2.

Arranged with each brake circuit 1 are an OUT-side gate valve 3 and an inlet valve 5. The valves 3, 5 include a solenoid valve for shutting off the brake circuit 1 when electric current is passed therethrough, respectively. A relief valve in and a one-way valve 1c are arranged in parallel to the OUT-side gate valve 3, whereas a one-way valve 1g is arranged in parallel to the inlet valve 5.

A drain circuit 10 is connected to the brake circuit 1 in a position downstream of the inlet valve 5, i.e. on the side of the wheel cylinder WC. The drain circuit 10 can be opened and closed by an outlet valve 6 including a normally-closed solenoid valve. A reservoir 7 is arranged with the drain circuit 10 to enable accumulation of brake fluid.

The drain circuit 10 is connected to the brake circuit 1 in a position upstream of the inlet valve 5, i.e. on the side of the master cylinder MC, through a circulation circuit 2. A main pump 4 is arranged with the circulation circuit 2 in the middle thereof to return to the brake circuit 1 brake fluid within the reservoir 7. A suction valve 4k and a discharge valve 4b are arranged with the main pump 4. A one-way valve 4h is arranged with the circulation circuit 2 in a position nearer the drain circuit 10 than the main pump 4.

The main pump 4 on the suction side is connected to the brake circuit 1 in a position upstream of the OUT-side gate valve 3 through an apply circuit 11. An apply pump 8 is arranged with the apply circuit 11 to supply to the main pump 4 brake fluid within the master circuit MC. An IN-side gate valve 9 including a normally-closed solenoid valve is arranged with the apply circuit 11 in a position upstream of the apply pump 8 to open and close the apply circuit 11. A suction valve 8c is arranged with the apply pump 8.

Figure 3:
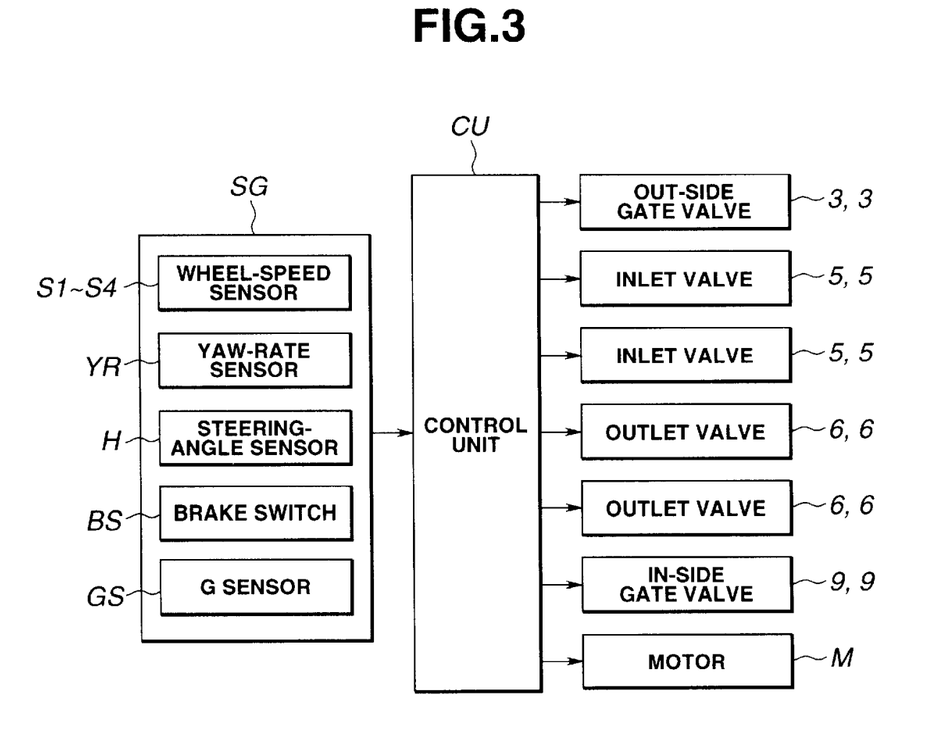
FIG. 3 is a block diagram showing a control unit connected to a sensor group, valves, and a motor.

Referring to FIG. 3, operation of a motor M for actuating the valves 3, 5, 6, 9 and driving the pumps 4, 8 is controlled by a control unit CU. The control unit CU is connected to a sensor group SG including wheel-speed sensors S1–S4 for sensing a wheel speed, a yaw-rate sensor YR for sensing a yaw rate of a vehicle, a steering-angle sensor H for sensing a steering angle, a brake switch BS which is turned on when depressing a brake pedal BP, not shown, and a G sensor GS for sensing longitudinal and lateral accelerations of a vehicle.

The control unit CU carries out ABS control for preventing wheel lock during braking operation and behavior stabilizing control for stabilizing vehicular behavior during cruising by a braking force produced.

ABS control and behavior stabilizing control, which are both known arts, will be described simply.

Regarding ABS control, a pseudo vehicle-body speed is calculated from wheel speeds obtained from signals of the wheel-speed sensors S1–S4, based on which a threshold value (decreased-pressure threshold value), for example, is calculated which corresponds to an ideal wheel speed during braking operation. For each wheel, a fluid pressure within the wheel cylinder WC is decreased or preserved or increased so that the wheel speed is between the pseudo vehicle-body speed and the threshold value.

Operation of the actuator unit AU at that time will be described. During ABS control, no electric current is passed through the gate valves 3, 9, so that the OUT-side gate valve 3 is open, and the IN-side gate valve 9 is closed as seen in the left circuit in FIG. 2. Upon pressure decrease, electric current is passed through the inlet valves 5, 6 to close the valve 5 and open the valve 6 so as to discharge to the drain circuit 10 brake fluid within the wheel cylinder WC, decreasing a wheel-cylinder pressure. An amount of decreased pressure is proportional to a period of time that electric current is passed through the valves 5, 6. Drained brake fluid is accumulated in the reservoir 7, then returned to the brake circuit 1 through operation of the main pump 4. Upon pressure preservation, electric current is passed through the inlet valve 5 only to close both the inlet valves 5, 6 so as to shut off the brake circuit 1 and the drain circuit 10, maintaining a wheel-cylinder pressure. Upon pressure increase, no electric current is passed through the inlet valves 5, 6 to open the inlet valve 5 only so as to supply to the wheel cylinder WC brake fluid within the brake circuit 1, increasing a wheel-cylinder pressure.

Regarding behavior stabilizing control, vehicular behavior is sensed based on information input from the sensor group SG. When vehicular behavior is unstable, a braking force is produced to stabilize behavior. Specifically, behavior stabilizing control includes position control wherein if it is determined that the vehicle is in understeer or oversteer based on information input from the sensor group SG, a braking force is produced to have a yaw moment so as to restrain this, and torque-skid control wherein when a driving wheel produces a skid during acceleration, a braking force is produced to restrain the skid.

Operation of the actuator unit AU at that time will be described. During behavior stabilizing control, electric current is passed through both the gate valves 3, 9 to close the OUT-side gate valve 3 so as to shut off the brake circuit 1, and open the IN-side gate valve 9 so as to put the apply circuit 11 in communication as seen in the left circuit in FIG. 2. The motor M is driven simultaneously. Thus, brake fluid within the master cylinder MC is sucked in the apply pump 8, which is supplied to the main pump 4 on the suction side. Brake fluid sucked in the main pump 4 is discharge to the brake circuit 1.

In the same way as during ABS control, pressure increase, preservation and decrease are switched by turn-on and turn-off of electric current through the inlet valves 5, 6 to produce a predetermined braking force in a predetermined wheel, achieving behavior stabilizing control. Note that flow indicated by broken line in FIG. 2 is produced when operation of the pumps 4, 8 makes a fluid pressure within the brake circuit 1 high. When a fluid pressure within the brake circuit 1 is high between the OUT-side gate valve 3 and the inlet valve 5, the relief valve 1n is open to return brake fluid to an upstream position of the brake circuit 1, obtaining circulation of brake fluid. Thus, a fluid pressure within the brake circuit 1 cannot be higher than a pressure for opening the relief valve 1n.

A general structure of the first embodiment will be described. Referring to FIG. 1, the control unit CU includes two divided parts: a main part 21 and a drive part 22.

The main part 21 includes an interface 21a connected to the sensors S1–S4 of the sensor group SG for signal conversion, a CPU 21b for carrying out a preprogrammed control-operation processing in accordance with signals derived from the interface 21a, a communication element 21c for outputting operation results of the CPU 21b, a power supply 21d including a watchdog timer for observing operation of the CPU 21b and for supplying power to component parts, the G sensor GS and yaw-rate sensor YR, and a drive circuit 21g for carrying out output upon occurrence of anomaly.

The drive part 22 is integrated with the actuator unit AU. The drive part 22 includes a drive unit 22a including circuits with relay switches for driving the solenoid valves 3, 5, 6, 9 and the motor M, a drive circuit or driver 22b for forming a drive signal for driving the drive unit 22a, i.e. the valves 3, 5, 6, 9 and motor M, a lamp lighting circuit 22c for forming signals for lighting warning lamps 12, a communication element 22d for inputting communication data from the main part 21, a CPU 22g for converting the communication data into signals for operating the drive circuit 22d and the lamp lighting circuit 22c, and a power supply 22f including a watchdog timer for observing operation of the CPU 22g and for supplying power to component parts.

The main part 21 is disposed in a cabin, not shown, substantially in the center of a vehicle. The drive part 22 is disposed in an engine room, not shown. The main part 21 and the drive part 22 are connected to each other through two or three communication wires including a serial communication wire 23 and a fail-safe communication wire 24 arranged through a dash board, not shown, for defining the cabin and the engine room.

Figure 4:
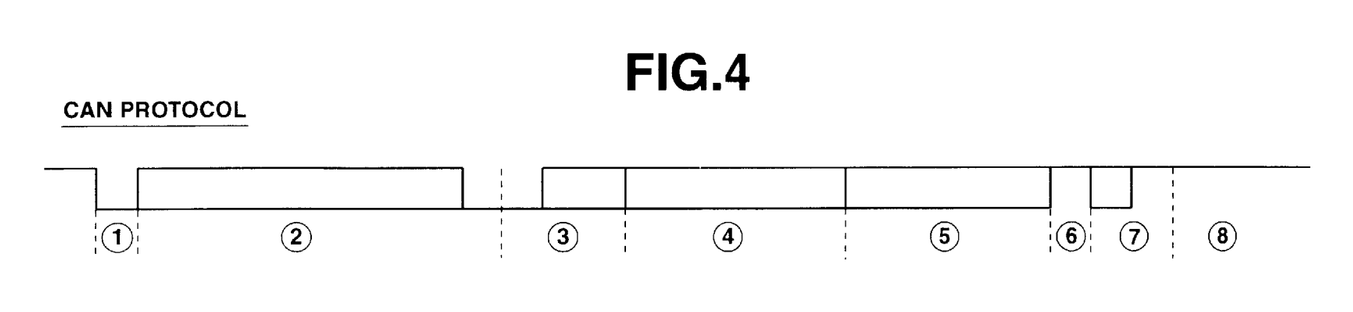
FIG. 4 is a diagrammatic view showing a Controller Area Network (CAN) protocol.

A description will be made with regard to the content of communication from the main part 21 to the drive part 22 through the serial communication wire 23. In the first embodiment, serial communication based on Controller Area Network (CAN) protocol is carried out between the main part 21 and the drive part 22. Referring to FIG. 4, a signal transmitted in one output of serial communication is divided into eight frames ①–⑧. The frame ① is a start frame indicating that serial communication starts. The frame ② is an arbitration field indicating an attribute. The frame ③ is a control field indicating a partition between the frame ② and the subsequent frame ④. The frame ④ is a data field indicating output to the drive circuit 22b. The frame ⑤ is a Cyclic Redundancy Check (CRC) field indicating the backup content of the content of the data field. The frame ⑥ is an Acknowledge (ACK) field indicating end of the CRC field. The frame ⑦ is an end-of-frame indicating end of one output of serial communication. The frame ⑧ is an interframe space which is vacant.

Figure 5:
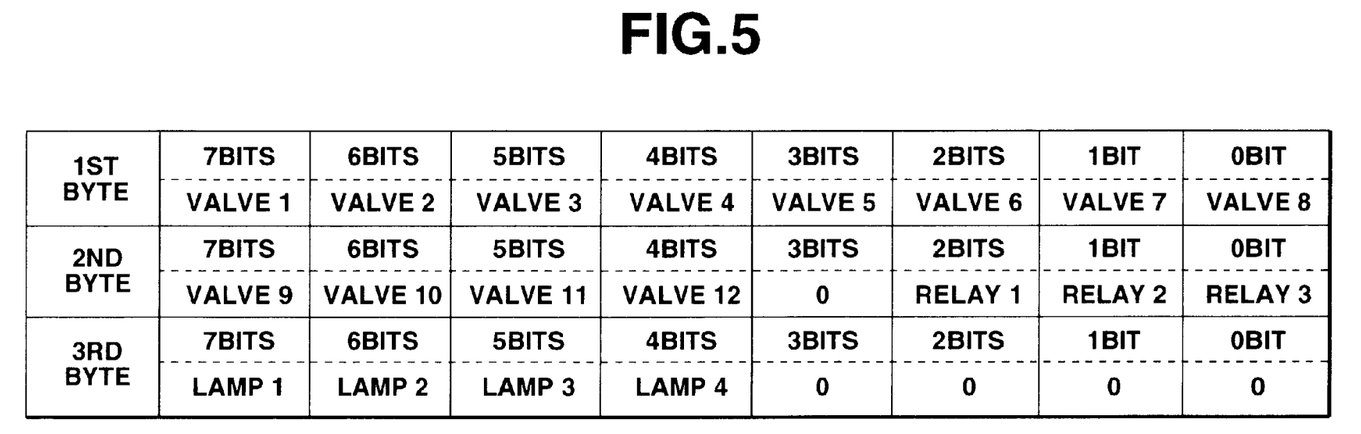
FIG. 5 is a table illustrating an example of communication data.

A structure of the data field ④ will be described in detail. FIG. 5 shows an example of the data field ④ including 8-bits 3-bytes data. In this example, information of [0] and [1] is stored in each bit which corresponds to each actuator, i.e. solenoid, motor M or lamp. The actuator is turned on when data of a corresponding bit is [1], and is turned off when it is [0]. Some of the bits are vacant.

Figure 6A:
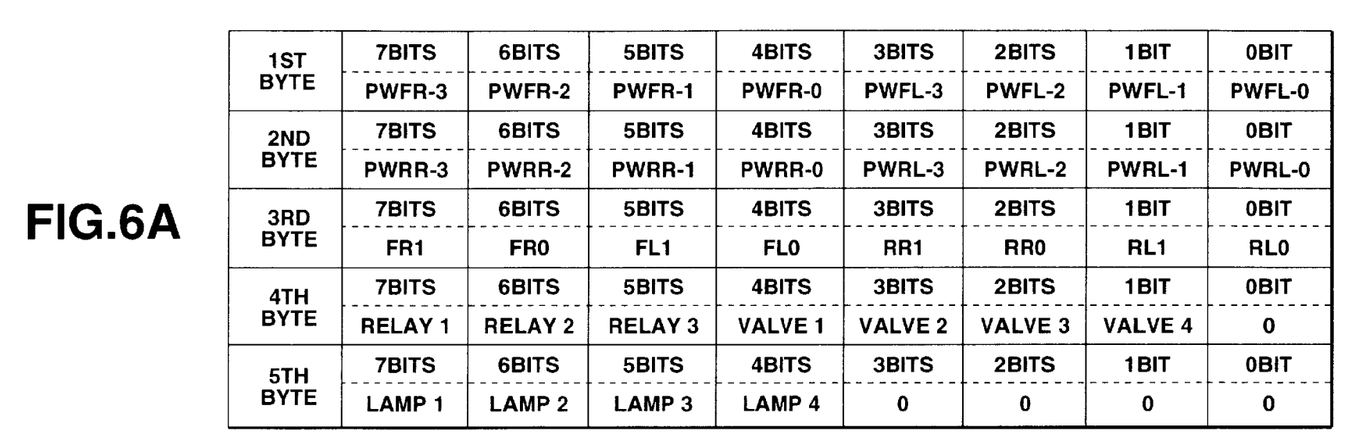
FIG. 6A is a view similar to FIG. 5, illustrating another example of communication data.
Figure 6B:
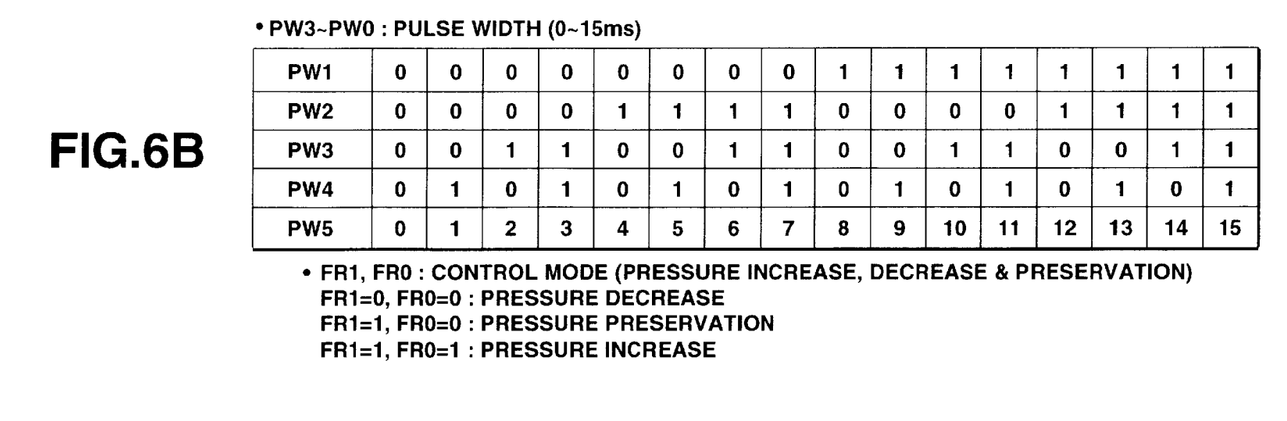
FIG. 6B is a view similar to FIG. 6A, illustrating the pulse width in pulse width (PW) control in the example of FIG. 6A.

FIGS. 6A–6B show another example of the data field ④ including 8-bits 5-bytes data. This example shows Pulse Width (PW) control for controlling opening and closing times of the inlet valve 5 and the outlet valve 6.

In the first embodiment, the drive part 22 compares data received through the serial communication wire 23 with a fail-safe signal received through the fail-safe communication wire 24. If the two are not consistent with each other, output of the drive part 22 is set to zero so as not to drive, e.g. a solenoid.

According to the first embodiment, the control unit CU includes two divided parts: the main part 21 for carrying out an operation processing in accordance with signals derived from the sensor group SG and the drive part 22 for driving the solenoid valves 3, 5, 6, 9 as actuators, the motor M, and the lamp 12. The main part 21 is disposed in a cabin, whereas the drive part 22 integrated with the actuator unit AU is disposed in an engine room. The main part 21 and the drive part 22 are connected to each other through the serial communication wire 23 for signal transmission by serial communication. Thus, the following effects can be obtained:

First, the number of communication wires and connectors can largely be decreased, resulting in a reduction in manufacturing cost and assembling time/cost.

Second, the main part 21 can be protected from heat of the engine room and heating portions of the actuator unit AU.

Third, the drive part 22 can be reduced in size, resulting in easy assembling to the actuator unit AU and improved degree of freedom of the design.

Fourth, even if the specifications of the actuator unit AU are varied, points to be changed are only a program of the main part 21 and an assembled state of the drive part 22 with respect to the actuator unit AU, enabling easy measures against the difference in the specifications of a vehicle, resulting in higher adaptability.

Fifth, since the number of communication wires for connecting the main and drive parts 21, 22 is only two, a communication-wire hole arranged through a dash board can be reduced in diameter, enabling simplified sealing structure and anti-noise structure, resulting in reduced manufacturing cost.

Sixth, in the drive part 22, the communication wire used for driving the actuators can be shortened, enabling a reduction in noise radiated therefrom, resulting in less influence of noise on other controllers.

Further, according to the first embodiment, since the G sensor GS and the yaw-rate sensor YR are both arranged in the main part 21, resulting in reduced assembling time as compared with when arranging the two separately, and simplified wiring due to the use of a common power circuit. Moreover, the sensors GS, YR arranged in one of the two divided parts of the control unit CU, i.e. the main part 21, are disposed in a cabin, resulting in less influence of heat and engine vibrations, smaller space in spite of integration with the control unit CU, and easy arrangement in the center of a vehicle, the most appropriate setting position of the yaw-rate sensor YR.

Furthermore, according to the first embodiment, CAN protocol is used in serial communication, enabling information exchange with other units of a vehicle, resulting in improved control efficiency.

Further, according to the first embodiment, 8-bits plural-bytes data are transmitted in serial communication, enabling transmission of plenty of information in one output of communication, resulting in a reduction in frequency of communication.

Still further, according to the first embodiment, the fail-safe CRC field ⑤ is provided in serial communication, resulting in higher reliability.

Still further, according to the first embodiment, a signal based on serial communication including the fail-safe CRC field ⑤ and transmitted through the serial communication wire 23 is compared with a signal transmitted through the serial communication wire 24 which is different from the serial communication wire 23. If the two are not consistent with each other, fail-safe control is carried out. This enables achievement of higher fail-safe performance.

Figure 7:
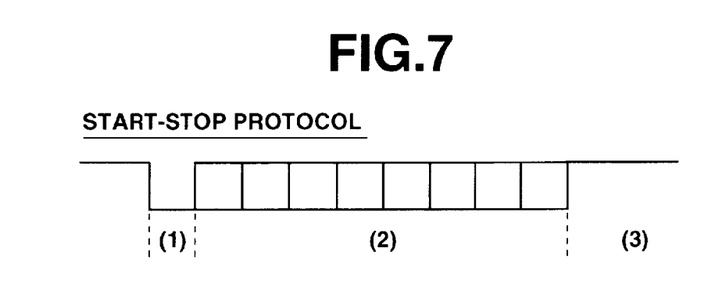
FIG. 7 is a view similar to FIG. 4, showing a second embodiment of the present invention.

FIG. 7 shows a second embodiment of the present invention wherein serial communication is based on start-stop protocol. FIG. 7 shows an example of serial communication based on start-stop protocol. In this example, a signal transmitted in one output of serial communication includes three frames: a start bit (1), a data bit (2), and a stop bit (3). The start bit (1) indicates start of signal transmission. The data bit (2) includes 8-bits data. The stop bit (3) indicates end of signal transmission.

When applying start-stop protocol for serial communication, an error due to noise can be distinguished, obtaining higher reliability.

Figure 8:
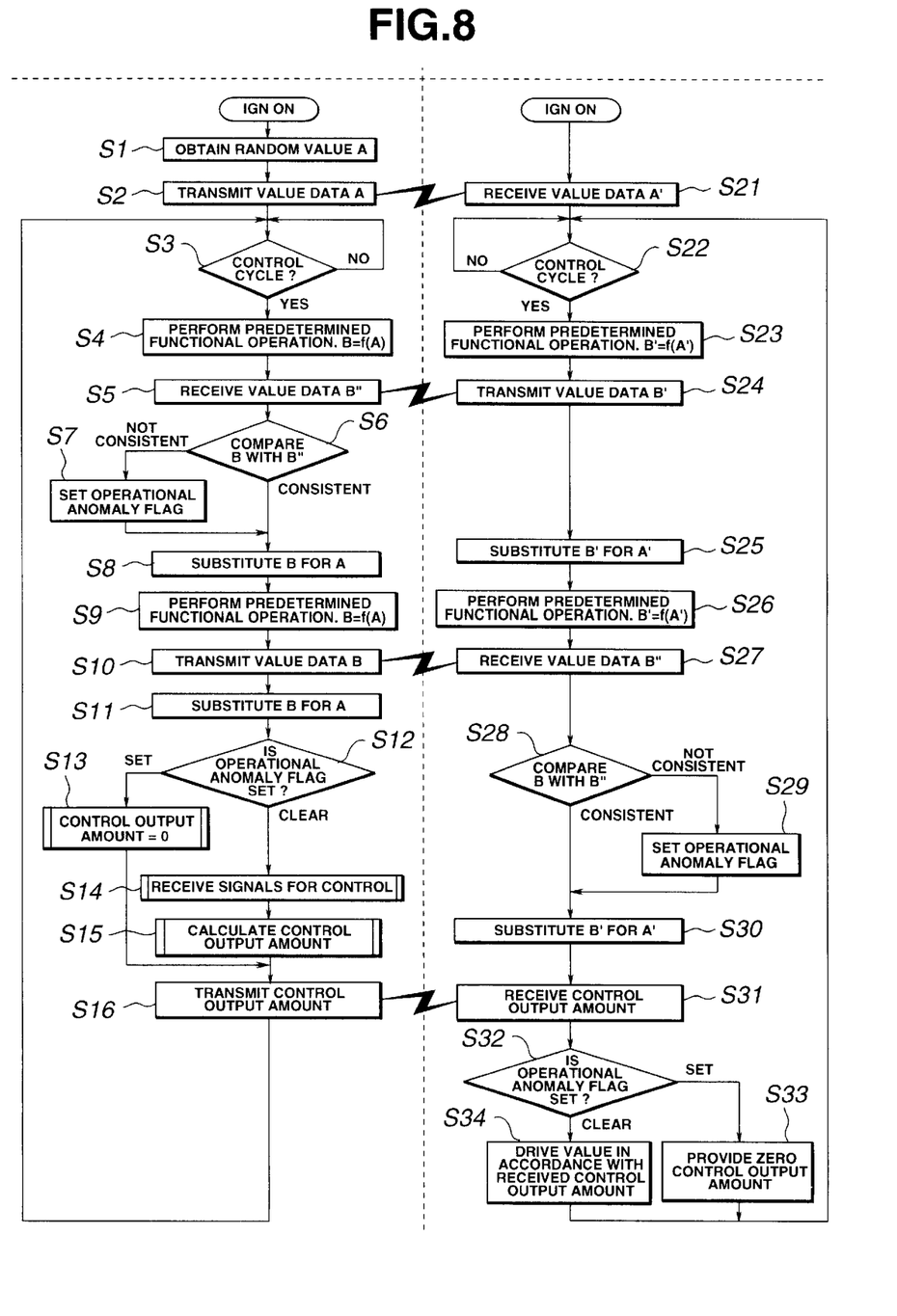
FIG. 8 is a flowchart showing a third embodiment of the present invention.

FIG. 8 shows a third embodiment of the present invention wherein diagnostic control is carried out by the CPU 21b of the main part 21 and the CPU 22g of the drive part 22 to diagnose whether or not operation is normal.

Referring to FIG. 8, the left shows flow in the main part 21, and the right shows flow in the drive part 22. Diagnostic control is started when turning on an ignition switch. In the main part 21, at a step S1, a random value A is obtained from, e.g. an A/D converted value of supply voltage. At a step S2, the value A is transmitted to the drive part 22. In the drive part 22, at a step S21, the value A is received as a value A'.

Every control cycle based on steps S3, S22, subsequent steps S4, S23 are started. That is, in the main part 21, at the step S4, the value A is applied to a predetermined function as will be described later to obtain a result B (B=f(A)). In the drive part 22, at the step S23, the value A' is applied to the same function to obtain a result B' (B'=f(A')).

In the drive part 22, at a step S24, the result B' is transmitted to the main part 21. In the main part 21, at a step S5, the result B' is received as a value B". And at a step S6, the result B is compared with the value B". If the two are consistent with each other, it is determined that the own program, the program of the drive part 22, and communication are all normal, and control proceeds to a step S8. If the two are not consistent with each other, it is determined that they are abnormal, control proceeds to a step S7 wherein an operational anomaly flag is set.

At the step S8, the result B is substituted for the value data A. At a step S9, functional operation is carried out again to obtain an operation result B (B=f(A)). And at a step S10, the operation result B is transmitted to the drive part 22.

In the drive part 22, at a step S25, the result B' obtained at the step S23 is substituted for the value date A'. At a step S26, functional operation is carried out again to obtain an operation result B' (B'=f(A')). And at a step S28, the value B" received from the main part 21 at a step S27 is compared with the operation result B' obtained at the step S26. If the two are not consistent with each other, control proceeds to a step S29 wherein an operational anomaly flag is set.

At a step S30, the operation result B' is substituted for the value data A'. At a step S31, a control output amount is received from the main part 21. And at a step S32, it is determined whether or not the operational anomaly flag is set. If the flag is set, control proceeds to a step S33 wherein the control output amount is set to zero to stop control. If the flag is not set, i.e. it is cleared, control proceeds to a step S34 wherein the valve, etc. are driven in accordance with the received control output amount.

In the main part 21, the value date B, which was transmitted at the step S10, is substituted for the value data A. At a step S12, it is determined whether or not the operational anomaly flag is set. If the flag is set, control proceeds to a step S13 wherein the control output amount is set to zero. If the flag is not set, i.e. it is cleared, control proceeds to a step S14 wherein various signals for control are received. At a step S15, the control output amount is calculated. And at a step S16, the control output amount, i.e. the operation result at the step S13 or S15, is transmitted to the drive part 22.

Figure 9:
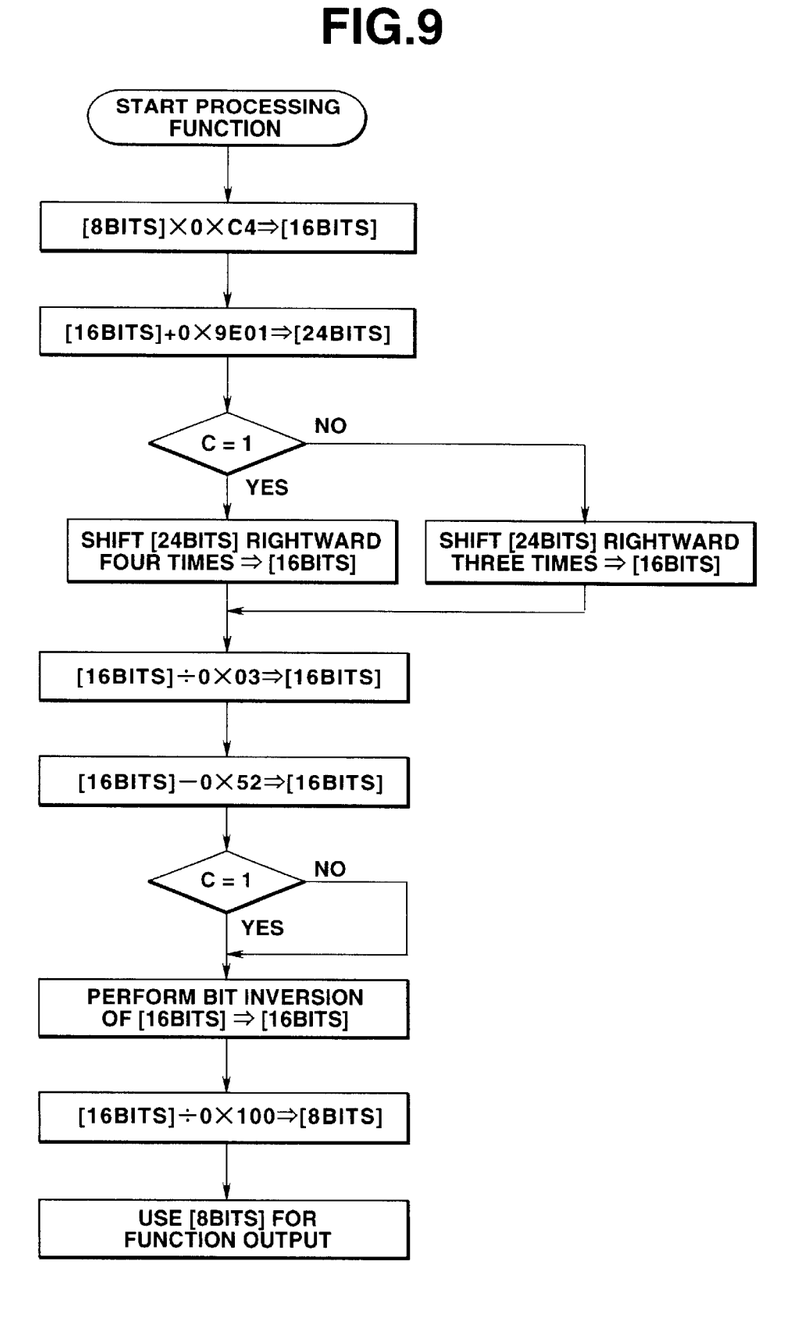
FIG. 9 is a view similar to FIG. 8, showing an example of functional operation.

Functional operation carried out at the steps S4, S9, S23, and S26 will be described. Functional operation includes addition, subtraction, multiplication, division, shift, and overflow determination. Execution of functional operation is directed to confirm whether or not a register, etc. for executing a program operate normally. FIG. 9 shows an example of functional operation.

According to the third embodiment, one of the control units 21, 22 transmits value data to another by communication. A result obtained by processing the value data using a predetermined function is returned to the one control unit, which is compared with an own result of functional operation to determine whether or not the system operates normally. Thus, the control units 21, 22 can confirm that, particularly, the CPUs 21b, 22g for executing operation operate normally, resulting improved reliability. Moreover, according to the third embodiment, functional operation includes addition, subtraction, multiplication, division, shift, and overflow determination, enabling confirmation of all processing functions.

Figure 10:
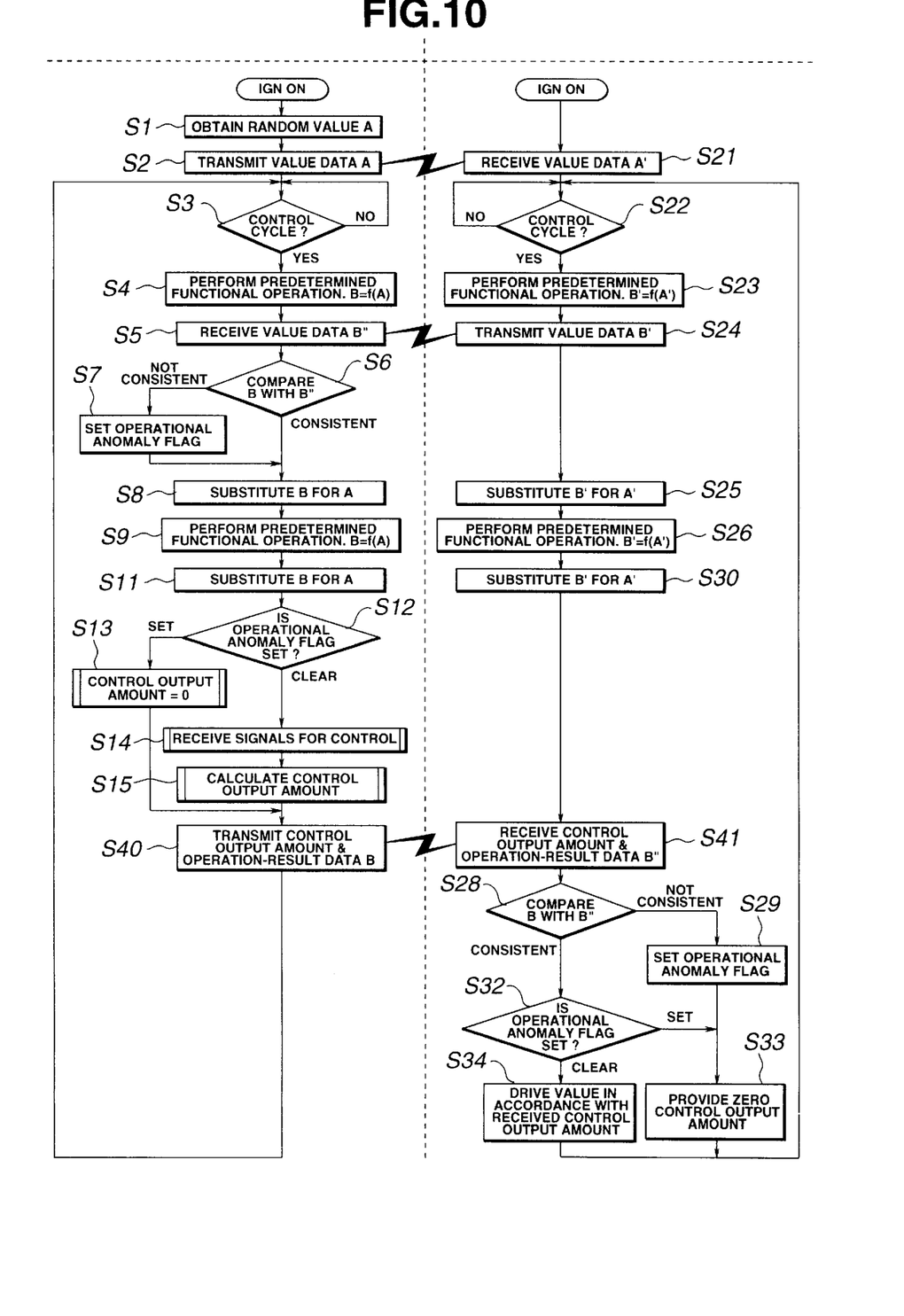
FIG. 10 is a view similar to FIG. 9, showing a variant of the third embodiment.

FIG. 10 shows a variant of the third embodiment as shown in FIG. 8, which is substantially the same as the third embodiment except steps S40 and S41 wherein transmission and reception of the control output amount and the data B are carried out simultaneously.

Having described the present invention with regard to the preferred embodiments, it is noted that the present invention is not limited thereto, and various changes and modifications can be made without departing from the scope of the present invention. By way of example, in addition to the braking controller in the embodiments, the present invention can be applied to other actuator controllers for motor vehicles such as an engine controller and a variable damping-force characteristic type suspension controller.

What is claimed is:

1. A system for a motor vehicle, comprising:
    an actuator unit, said actuator unit including a brake circuit for ensuring communication of a master cylinder with a wheel cylinder; a fluid-pressure controlling valve arranged with said brake circuit for enabling achievement of three pressure states; an increased-pressure state that said brake circuit is in communication, a decreased-pressure state that said wheel cylinder communicates with a drain circuit, and a preserved-pressure state that said wheel cylinder is closed with respect to said brake circuit and said drain circuit; a reservoir arranged with said drain circuit for enabling accumulation of a brake-fluid pressure; a circulation circuit for ensuring communication of said drain circuit with said brake circuit in a position upstream of said fluid-pressure controlling valve; a pump arranged with said circulation circuit for returning to said brake circuit brake fluid accumulated in said reservoir; and a motor for operating said fluid-pressure controlling valve and said pump;
    a first control unit, said first control unit carrying out a preprogrammed processing of an input signal, said first control unit being disposed in a first position of the motor vehicle;
    a second control unit connected to and integrated with said actuator unit, said second control unit being disposed in a second position of the motor vehicle distant from said first position, said second control unit forming a drive signal in accordance with a processing result of said first control unit; and
    a first communication line connected to said first and second control units;
    wherein said first control unit provides said processing result as a communication signal by a serial communication; and
    wherein said first control unit converts said communication signal received into said drive signal.

2. A system as claimed in claim 1, wherein said serial communication is based on CAN protocol.

3. A system as claimed in claim 1, wherein said serial communication is based on start-stop protocol.

4. A system as claimed in claim 1, wherein said input signal of said first control unit is derived from sensors for sensing cruising conditions of the motor vehicle.

5. A system as claimed in claim 1, wherein said first position of said first control unit corresponds to the inside of a cabin separated from an engine.

6. A system as claimed in claim 5, wherein said second position of said second control unit corresponds to the outside of said cabin.

7. A system as claimed in claim 4, wherein at least one of said sensors is integrated with said first control unit.

8. A system as claimed in claim 1, wherein said communication signal includes a binary signal expressed as 0 and 1.

9. A system as claimed in claim 8, wherein said binary signal corresponds to a signal obtained by encoding an output time of said drive signal of said second control unit.

10. A system as claimed in claim 9, wherein said communication signal includes a fail-safe signal corresponding to anomaly diagnosis carried out in said first control unit.

11. A system as claimed in claim 10, further comprising a second communication wire connected to said first and second control units, said second communication wire allowing redundant transmission of said fail-safe signal.

12. A system as claimed in claim 11, wherein said second control unit compares data included in said communication signal with said fail-safe signal, wherein if the two are inconsistent with each other, said second control unit provides said drive signal on the safe side.

13. A system as claimed in claim 1, wherein said first control unit actuates said fluid-pressure controlling valve in accordance with information input from said sensors to at least decrease and preserve a wheel-cylinder pressure, and operates said pump to circulate to said brake circuit brake fluid within said reservoir so as to obtain an ABS control for preventing wheel lock during braking operation.

14. A system as claimed in claim 13, wherein said actuator unit further includes a normally-open OUT-side gate valve arranged with said brake circuit in a position upstream of said circulation circuit for closing said brake circuit, and an apply circuit arranged with said brake circuit for ensuring communication of a brake-fluid source with said pump on the suction side, said apply circuit including an apply pump and a normally-closed IN-side gate valve.

15. A system as claimed in claim 14, wherein when it is determined in accordance with information input from said sensors that a behavior of the motor vehicle is unstable, said first control unit closes said OUT-side gate valve, opens said IN-side gate valve, and operates said pump and apply pump to actuate said fluid-pressure controlling valve so as to produce a braking force in a predetermined wheel for a behavior stabilizing control for stabilizing said behavior.

16. A system as claimed in claim 15, wherein said behavior stabilizing control includes a position control for producing a braking force to have a yaw moment so as to stabilize said behavior.

17. A system as claimed in claim 15, wherein said sensors include a yaw-rate sensor for sensing a yaw rate of the motor vehicle and an acceleration sensor for sensing an acceleration of the motor vehicle.

18. A system as claimed in claim 12, wherein said first and second control units are constructed to transmit value data from one to another, carry out a functional operation of said value data in said another, return a result of said functional operation of said another to said one, compare a result of said functional operation of said one with said result of said functional operation of said another, and determine that the system is normal when said results are consistent with each other.

19. A system as claimed in claim 18, wherein said functional operation includes addition, subtraction, multiplication, division, shift, and overflow determination.

20. A system for a motor vehicle, comprising:

an actuator unit;

a first control unit, said first control unit carrying out a preprogrammed processing of an input signal, said first control unit being disposed in a first position of the motor vehicle;

a second control unit connected to and integrated with said actuator unit, said second control unit being disposed in a second position of the motor vehicle distant from said first position, said second control unit forming a drive signal in accordance with a processing result of said first control unit; and a first communication line connected to said first and second control units;

wherein said first control unit provides said processing result as a communication signal by a serial communication; and wherein said second control unit converts said communication signal received into said drive signal, said communication signal including a binary signal expressed as 0 and 1, said binary signal corresponding to a signal obtained by encoding an output time of said drive signal of said second control unit, said communication signal including a fail-safe signal corresponding to anomaly diagnosis carried out in said first control unit in accordance with a result derived from data communication between said first and second control units.

21. A system as claimed in claim 20, wherein said result of data communication is obtained such that data is processed in said first and second control units using a predetermined function, which is interchanged between said first and second control units and is confirmed to be consistent with a given data.

22. A system for a motor vehicle, comprising:

an actuator unit;

a first control unit, said first control unit carrying out a preprogrammed processing of an input signal, said first control unit being disposed in a first position of the motor vehicle;

a second control unit connected to and integrated with said actuator unit, said second control unit being disposed in a second position of the motor vehicle distant from said first position, said second control unit forming a drive signal in accordance with a processing result of said first control unit;

a first communication line connected to said first and second control units;

wherein said first control unit provides said processing result as a communication signal by a serial communication;

wherein said second control unit converts said communication signal received into said drive signal, said communication signal including a binary signal expressed as 0 and 1, said binary signal corresponding to a signal obtained by encoding an output time of said drive signal of said second control unit, said communication signal including a fail-safe signal corresponding to anomaly diagnosis carried out in said first control unit; and a second communication line connected to said first and second control units, said second communication line allowing redundant transmission of said fail-safe signal;

wherein said second control unit compares a first data derived from said first control unit through said first communication line with a second data derived from said first control unit through said second communication line, wherein if the two are inconsistent with each other, said second control unit provides said drive signal.

* * * * *